(12) United States Patent
Hiller et al.

(10) Patent No.: US 11,088,524 B2
(45) Date of Patent: Aug. 10, 2021

(54) POWER LINE PROTECTIVE APPARATUS HAVING ROTATABLE MEMBERS

(71) Applicant: TE CONNECTIVITY CORPORATION, Berwyn, PA (US)

(72) Inventors: Laura Jackson Hiller, Cary, NC (US); David Edwin Bowling, Fuquay-Varina, NC (US); Stephen Martin Parker, Greensboro, NC (US); Luis Puigcerver, Cary, NC (US)

( * ) Notice: Subject to any disclaimer, the term of this patent is extended or adjusted under 35 U.S.C. 154(b) by 238 days.

(21) Appl. No.: 16/434,917

(22) Filed: Jun. 7, 2019

(65) Prior Publication Data

US 2019/0379196 A1 Dec. 12, 2019

Related U.S. Application Data

(60) Provisional application No. 62/683,873, filed on Jun. 12, 2018.

(51) Int. Cl.
*H02G 7/00* (2006.01)
*H02G 1/04* (2006.01)

(52) U.S. Cl.
CPC .............. *H02G 7/00* (2013.01); *H02G 1/04* (2013.01)

(58) Field of Classification Search
CPC .................................. H02G 7/00; H02G 1/04
See application file for complete search history.

(56) References Cited

U.S. PATENT DOCUMENTS

| 4,815,896 A * | 3/1989 | Fox | F16L 1/123 |
| | | | 174/136 |
| 6,226,933 B1 * | 5/2001 | Nelson | A01G 13/10 |
| | | | 43/124 |
| 8,359,791 B1 * | 1/2013 | Nixon | A01M 29/32 |
| | | | 52/101 |

FOREIGN PATENT DOCUMENTS

| GB | 2 290 565 A | 1/1996 |
| JP | 2011-211809 A | 8/2001 |

OTHER PUBLICATIONS

International Search Report and Written Opinion of the International Searching Authority, International Application No. PCT/US2019/035970, dated Aug. 22, 2019, 22 pp.

* cited by examiner

*Primary Examiner* — Pete T Lee

(57) ABSTRACT

A protective apparatus for a distribution line conductor includes an elongate tube configured to be installed on the conductor and a plurality of annular members concentrically positioned on the tube and configured to rotate independently of each other. The tube has a longitudinal axis and defines a longitudinally extending chamber configured to receive the conductor. The tube has opposite first and second ends and a longitudinally extending opening from the first end to the second end that facilitates installation of the elongate tube on the conductor. Each annular member includes an outer surface and a plurality of circumferentially-spaced apart members extending outwardly from the outer surface. Each annular member includes a longitudinally extending slot that is configured to align with the longitudinally extending opening of the tube to facilitate installation of the elongate tube and the plurality of annular members as an assembly on the conductor.

19 Claims, 11 Drawing Sheets

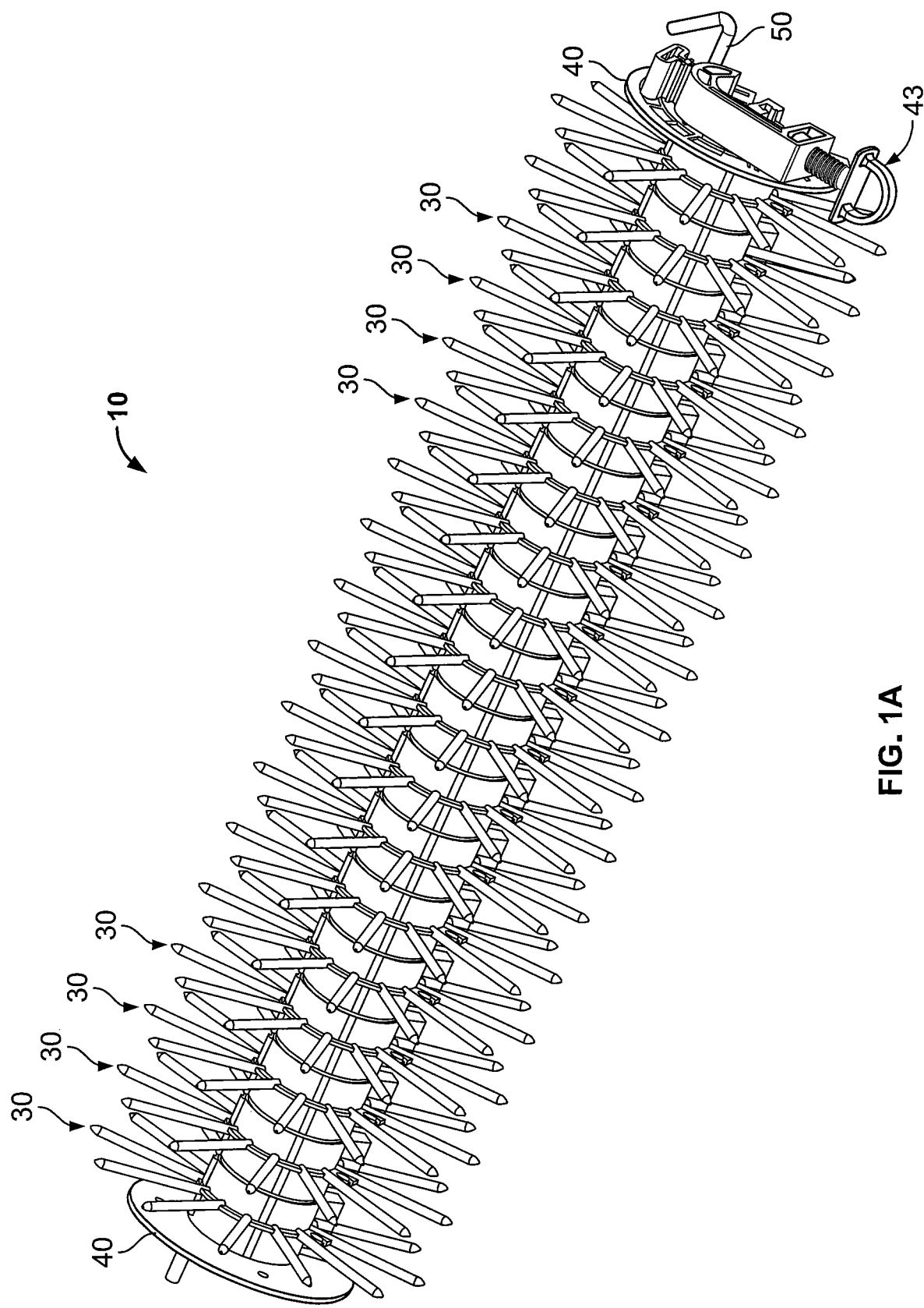

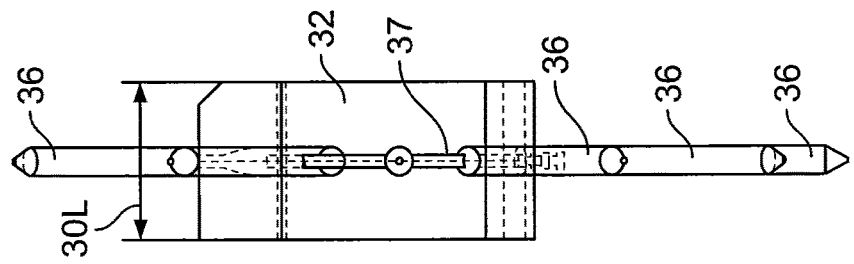
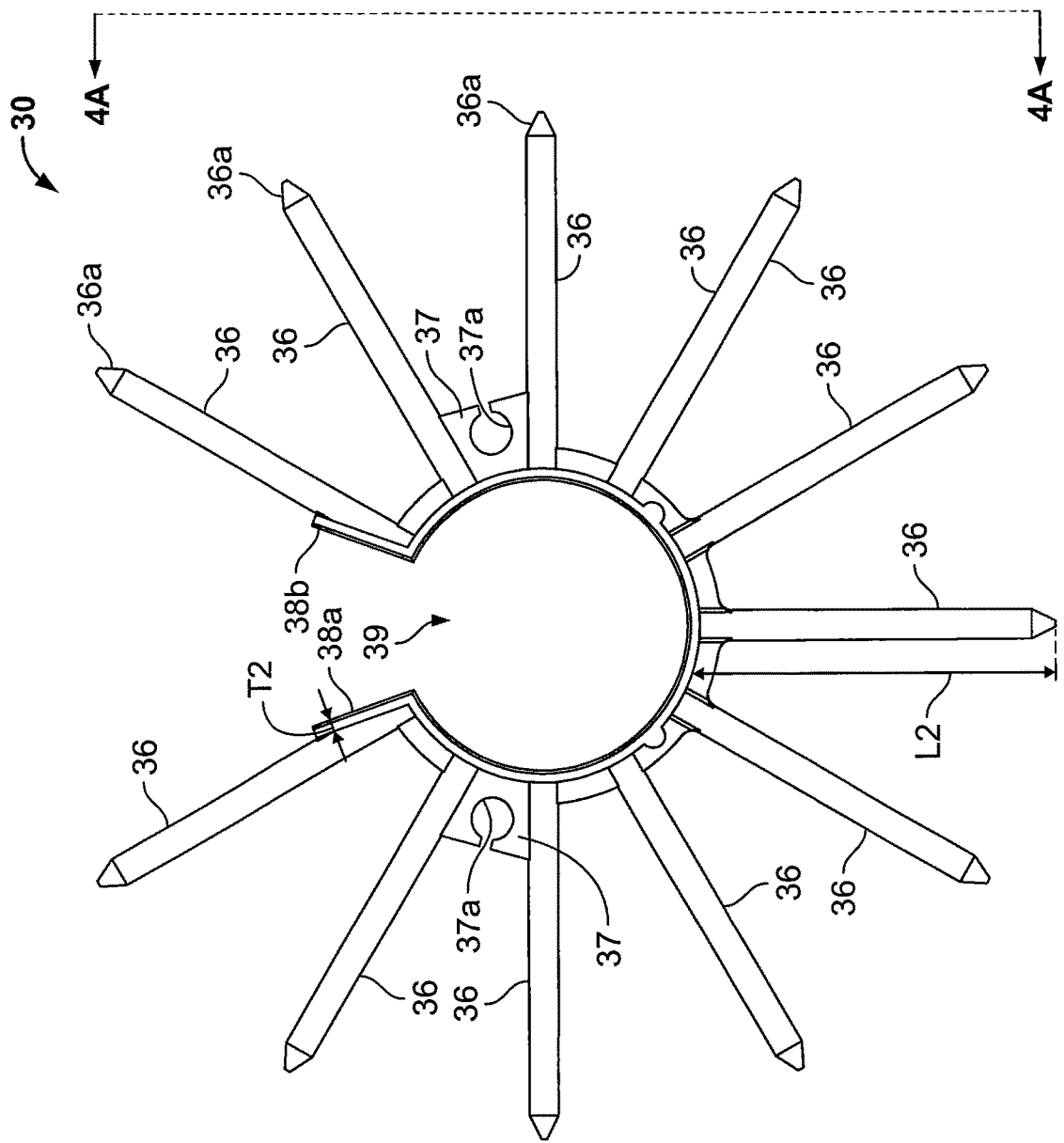
FIG. 4A
FIG. 4

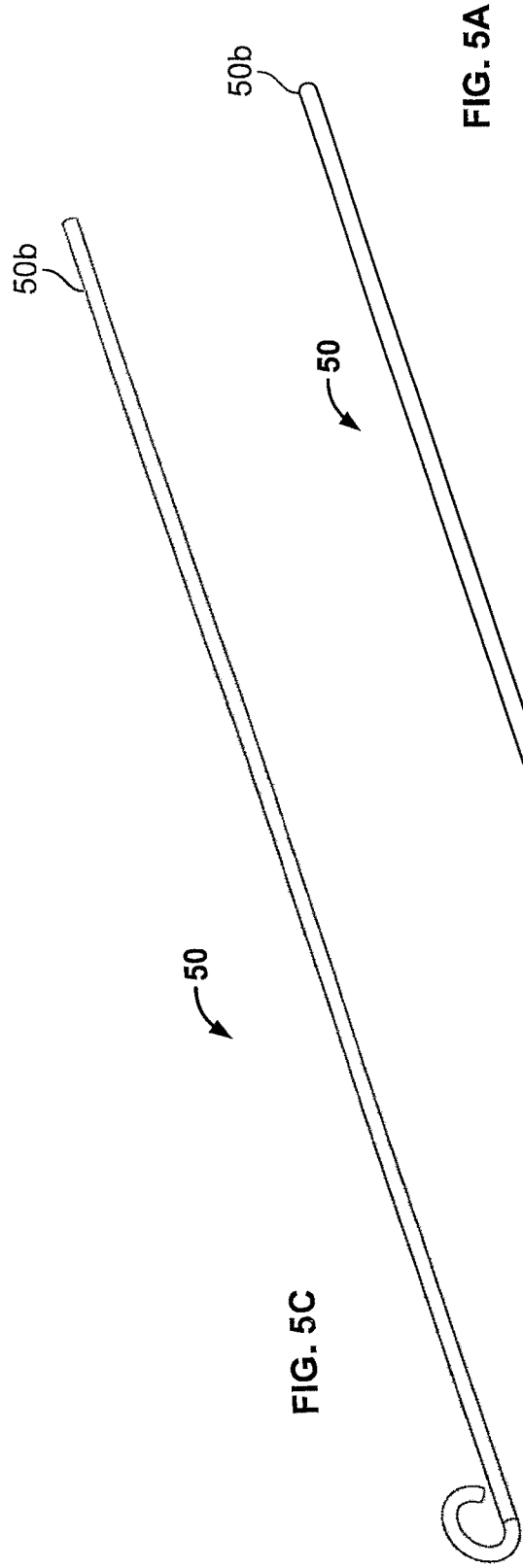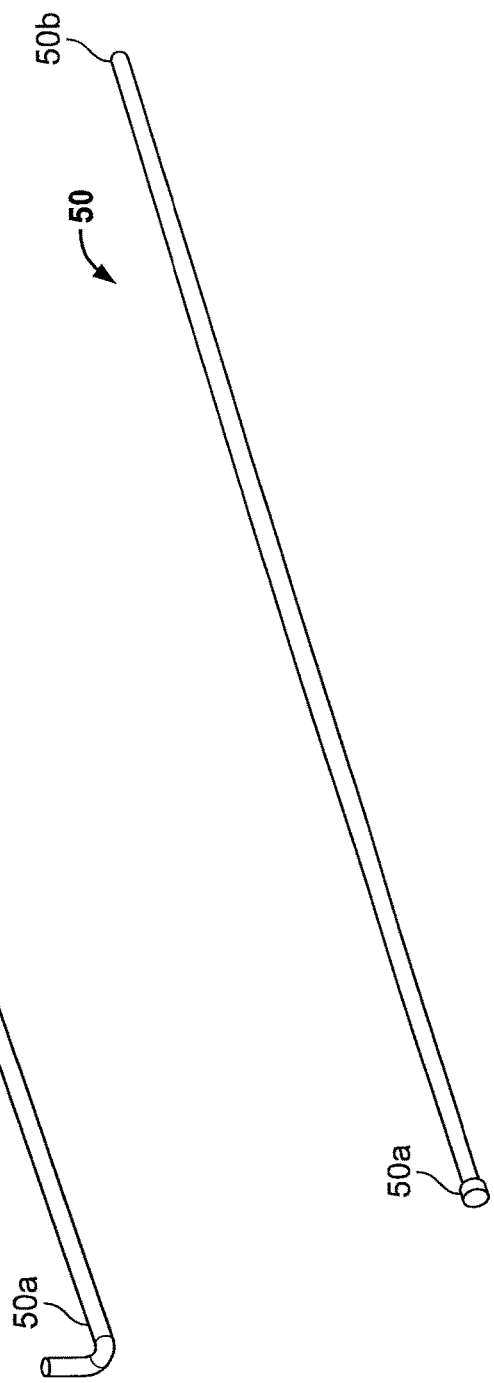

US 11,088,524 B2

POWER LINE PROTECTIVE APPARATUS HAVING ROTATABLE MEMBERS

RELATED APPLICATION

This application claims the benefit of and priority to U.S. Provisional Patent Application No. 62/683,873 filed Jun. 12, 2018, the disclosure of which is incorporated herein by reference as if set forth in its entirety.

FIELD OF THE INVENTION

The present invention relates to protective guards and, more particularly, to wildlife guards for power distribution lines.

BACKGROUND OF THE INVENTION

Squirrels frequently traverse elevated electrical power lines and utility poles and may climb onto equipment, such as transformers. An insulated bushing, for example, may be positioned on a transformer where the electrical power line connects to the transformer. Unfortunately, a potential difference or voltage exists between the electrical lines and the transformer that may cause an electrical short and electrocute the squirrel if the squirrel simultaneously contacts the transformer and the electrical line. This may damage expensive equipment and cause a localized power outage that may require expensive and time-consuming repairs and extended electrical outages.

One known solution to the foregoing problem is to install a wildlife guard that may be referred to as a "squirrel guard". Typically, a wildlife guard includes one or more parts forming a disk with an aperture. The wildlife guard is mounted on an insulator (e.g., between sheds) such that the disc extends radially outwardly from the insulator beyond the sheds. The wildlife guard substantially increases the distance from earth potential to the high voltage equipment so that wildlife are prevented from simultaneously making contact with each of, and thereby bridging, earth potential and the high voltage equipment. Another type of wildlife guard includes a pair of pivotally connected cover portions that, when closed, form a hollow body that enclose an insulator.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a protective apparatus for a distribution line conductor (i.e., a power line) includes an elongate tube configured to be installed on the conductor and a plurality of annular members concentrically positioned on the tube and configured to rotate independently of each other on the tube. The tube has a longitudinal axis and defines a longitudinally extending chamber configured to receive the conductor. The tube has opposite first and second ends and a longitudinally extending opening from the first end to the second end that facilitates installation of the elongate tube on the conductor. Each annular member includes an outer surface and a plurality of circumferentially-spaced apart members, such as spikes, extending outwardly from the outer surface. Each annular member includes a longitudinally extending slot that is configured to align with the longitudinally extending opening of the tube to facilitate installation of the elongate tube and the plurality of annular members as an assembly on the conductor.

Each annular member may include at least one counterweight that is configured to provide the annular member with a center of gravity located at the center of the annular member, which also coincides with the longitudinal axis of the tube when the annular member is concentrically positioned on the tube. As such, the annular members will rotate and end up at random orientations after rotation has stopped. In some embodiments, each annular member includes a pair of counterweights with each counterweight positioned on a respective side of the slot of the annular member. In some embodiments, each counterweight is attached to a respective one of the spikes. In other embodiments, each annular member includes one or more flange portions adjacent the respective longitudinally extending slot that may serve as a counterweight.

First and second flanges are attached to the first and second ends of the tube respectively, and these flanges are configured to prevent the plurality of annular members from slipping off the ends of the tube. During installation of the apparatus on a power line, a retaining rod is removably secured to and extends between the first and second flanges. The slots of the respective annular members are aligned with the longitudinal opening in the tube and the retaining rod is configured to inhibit rotation of the plurality of annular members during the installation of the apparatus on the conductor so that the slots and opening remain aligned. In some embodiments, each annular member includes a retaining member through which the retaining rod can pass thereby ensuring that the slots of the respective annular members are aligned with the longitudinal opening in the tube. In some embodiments, at least one of the first and second flanges comprises a mechanism that is configured to be gripped by a hotstick or other tool to install, remove or otherwise manipulate the apparatus.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

FIG. 1A is a top perspective view of a protective apparatus for a distribution line conductor, according to some embodiments of the present invention.

FIG. 4 is a plan view of the annular member of FIG. 3.

FIG. 4A is a side view of the annular member of FIG. 4 taken along lines 4A-4A.

FIG. 5A is a perspective view of a retaining rod for use in inhibiting rotation of the plurality of annular members during the installation of the protective apparatus of FIG. 1A on a conductor, according to one embodiment of the present invention.

FIG. 5B is a perspective view of a retaining rod for use in inhibiting rotation of the plurality of annular members during the installation of the protective apparatus of FIG. 1A on a conductor, according to another embodiment of the present invention.

FIG. 5C is a perspective view of a retaining rod for use in inhibiting rotation of the plurality of annular members during the installation of the protective apparatus of FIG. 1A on a conductor, according to another embodiment of the present invention.

DETAILED DESCRIPTION

Figure 1B:
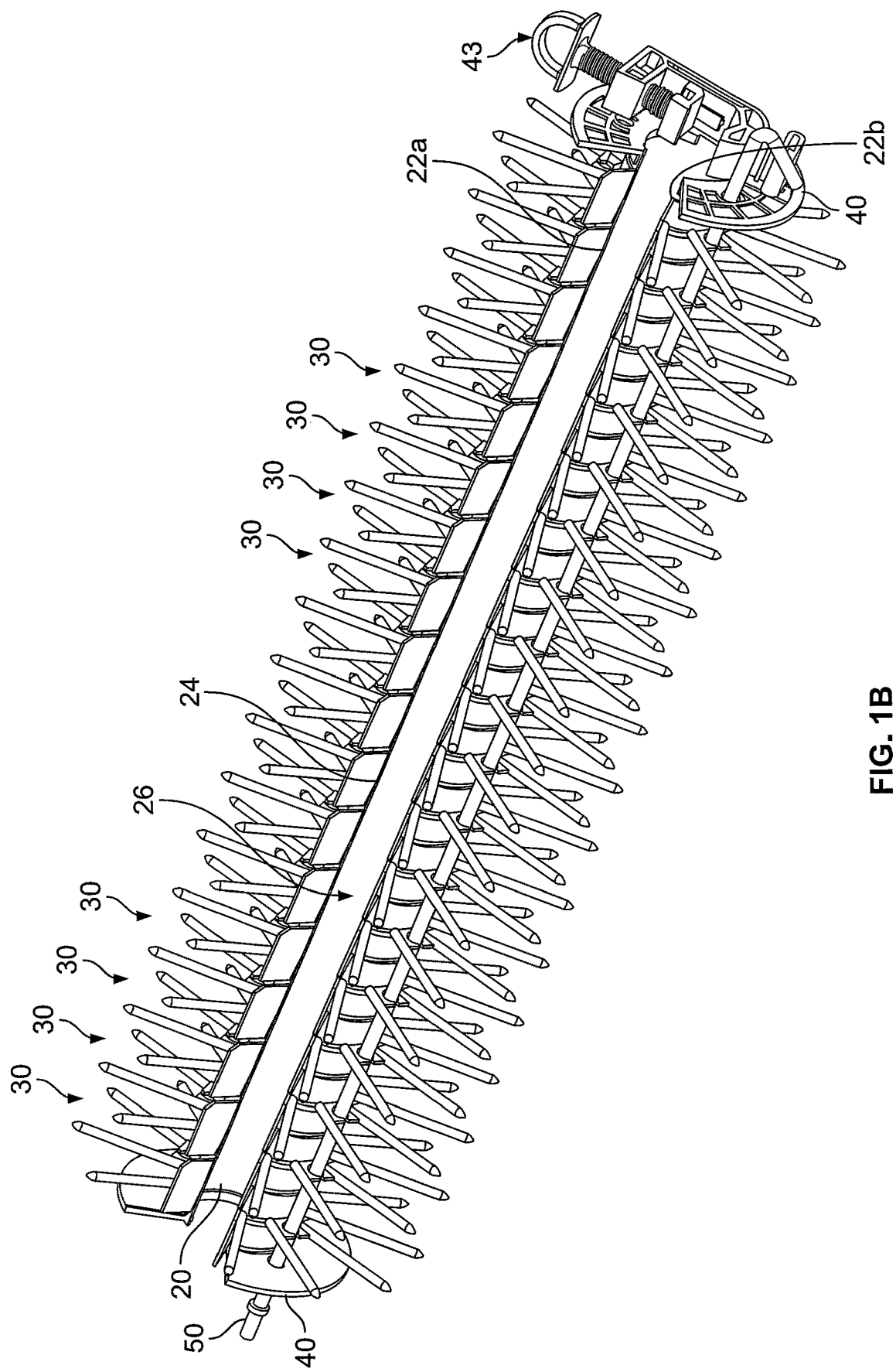
FIG. 1B is a bottom perspective view of the protective apparatus of FIG. 1A.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "secured", "connected", "attached" or "coupled" to another feature or element, it can be directly secured, directly connected, attached or coupled to the other feature or element or intervening features or elements may be present. In contrast, when a feature or element is referred to as being, for example, "directly secured", "directly connected", "directly attached" or "directly coupled" to another feature or element, there are no intervening features or elements present. The phrase "in communication with" refers to direct and indirect communication. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

As used herein, the term "and/or" includes any and all combinations of one or more of the associated listed items and may be abbreviated as "/".

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "about", as used herein with respect to a value or number, means that the value or number can vary by +/− twenty percent (20%).

Figure 1C:
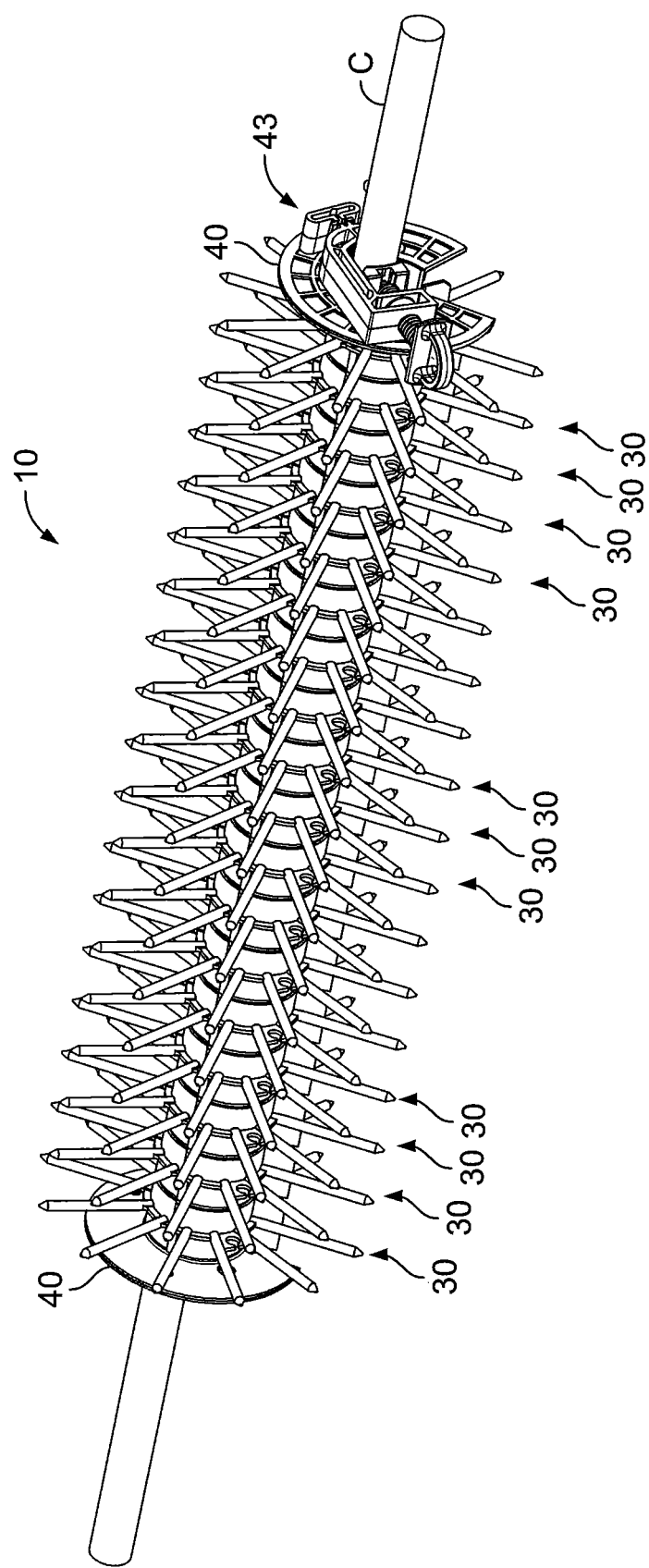
FIGS. 1C and 1D are top perspective views of the protective apparatus of FIG. 1A installed on a conductor, such as a power line.
Figure 1D:
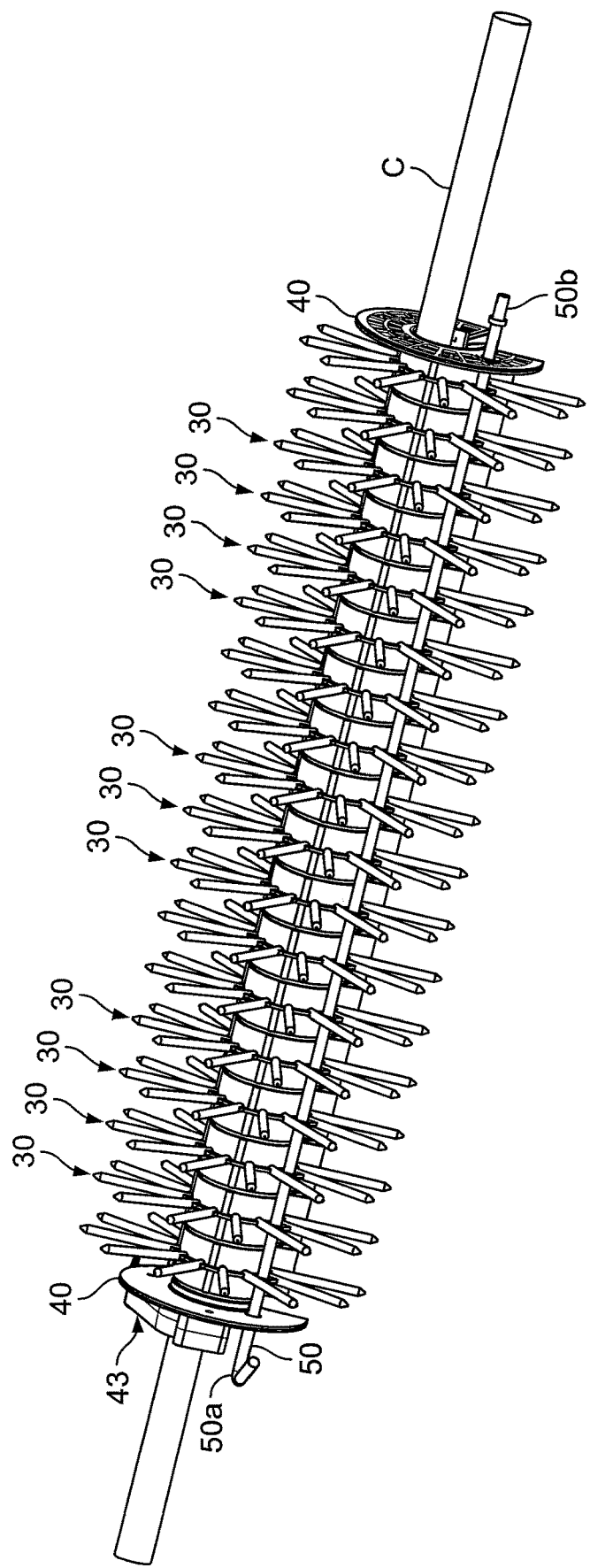
Figure 2:
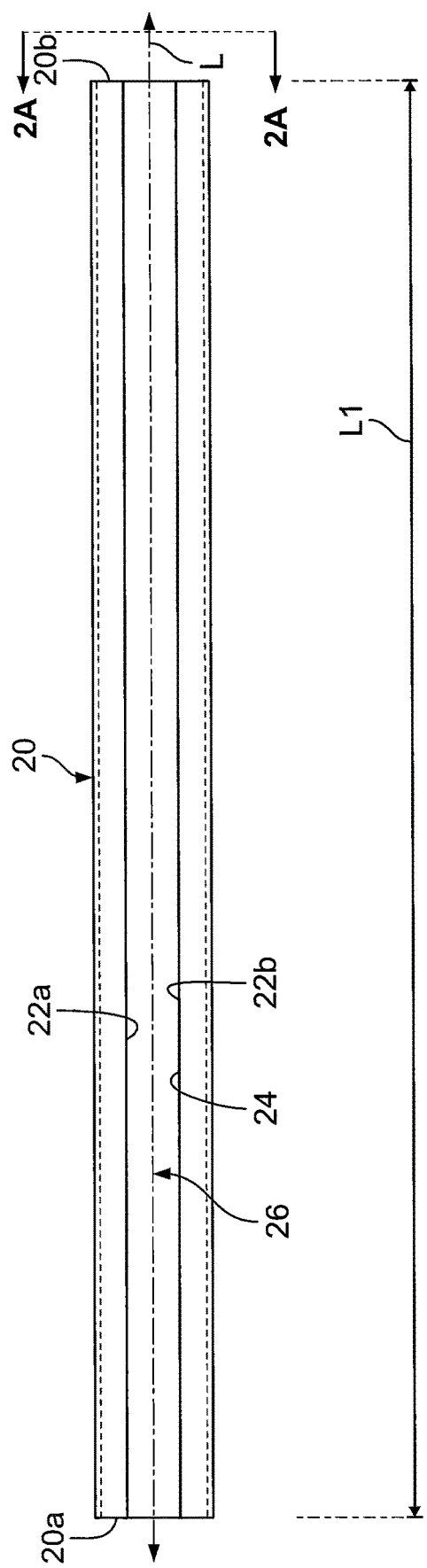
FIG. 2 is a plan view of the elongate tube of the protective apparatus of FIG. 1A.
Figure 2A:
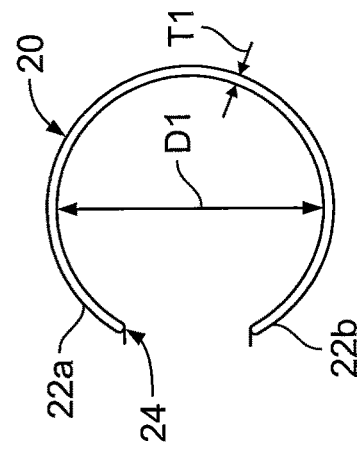
FIG. 2A is an end view of the elongate tube of FIG. 2 taken along lines 2A-2A.

Referring to FIGS. 1A-1B, a protective apparatus 10 for a distribution line conductor (i.e., a power line) will be described. The illustrated protective apparatus 10 in FIGS. 1A-1B includes an elongate member, preferably a tube 20, configured to be installed on a conductor (C, FIGS. 1C-1D), and a plurality of annular members 30 are concentrically positioned on the tube 20 and configured to rotate on the tube 20 independently of each other. The tube 20 has a longitudinal axis L (FIG. 2) and defines a longitudinally extending chamber 26 configured to receive the conductor C. The illustrated tube 20 has opposite first and second ends 20a, 20b and adjacent spaced apart longitudinal edges 22a, 22b that form a longitudinally extending opening 24 that extends from the first end 20a to the second end 20b. The opening 24 facilitates installation of the elongate tube 20 on a conductor.

Figure 3:
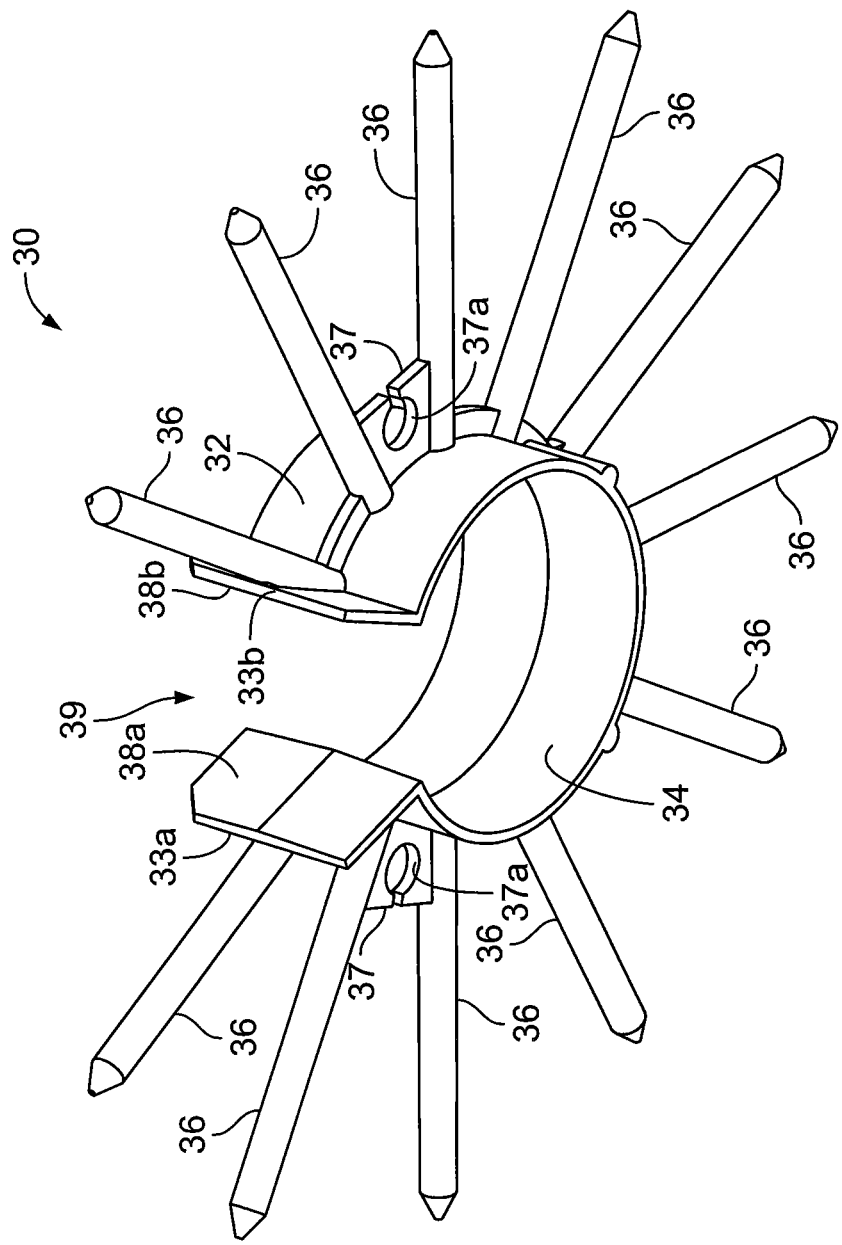
FIG. 3 is a perspective view of an annular member of the protective apparatus of FIG. 1A, according to some embodiments of the present invention.
Figure 6B:
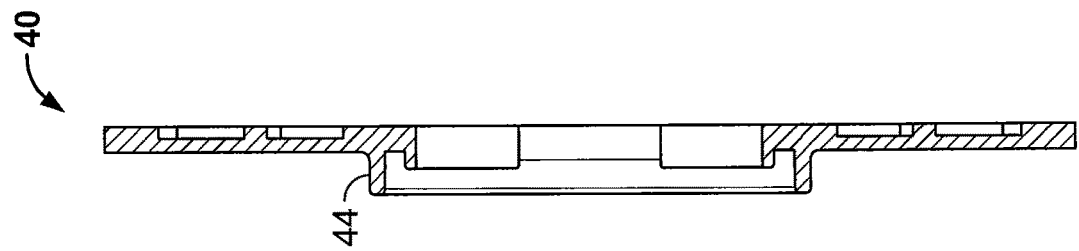
FIG. 6B is a cross-sectional view of the flange of FIG. 6A taken along lines 6B-6B.
Figure 6A:
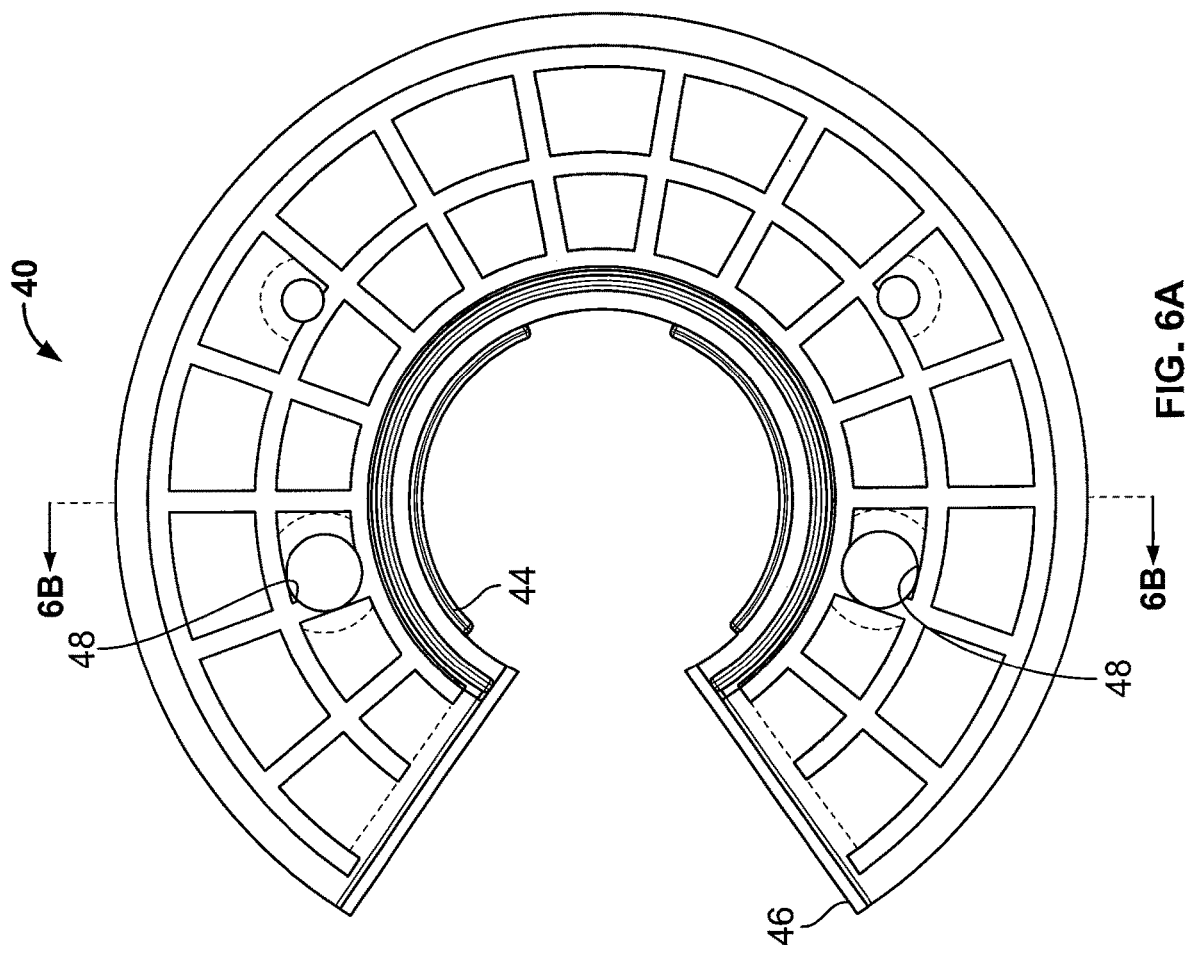
FIG. 6A is a plan view of a flange that can be attached to each end of the tube of the protective apparatus of FIG. 1A, according to some embodiments of the present invention.
Figure 6D:
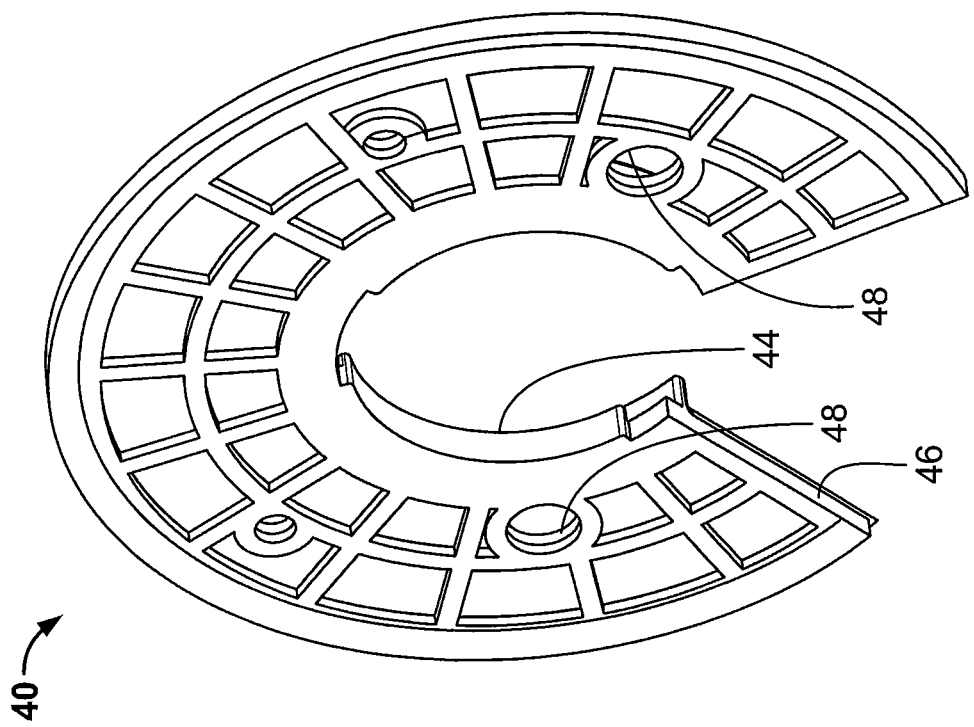
FIG. 6D is a rear perspective view of the flange of FIG. 6A.
Figure 6C:
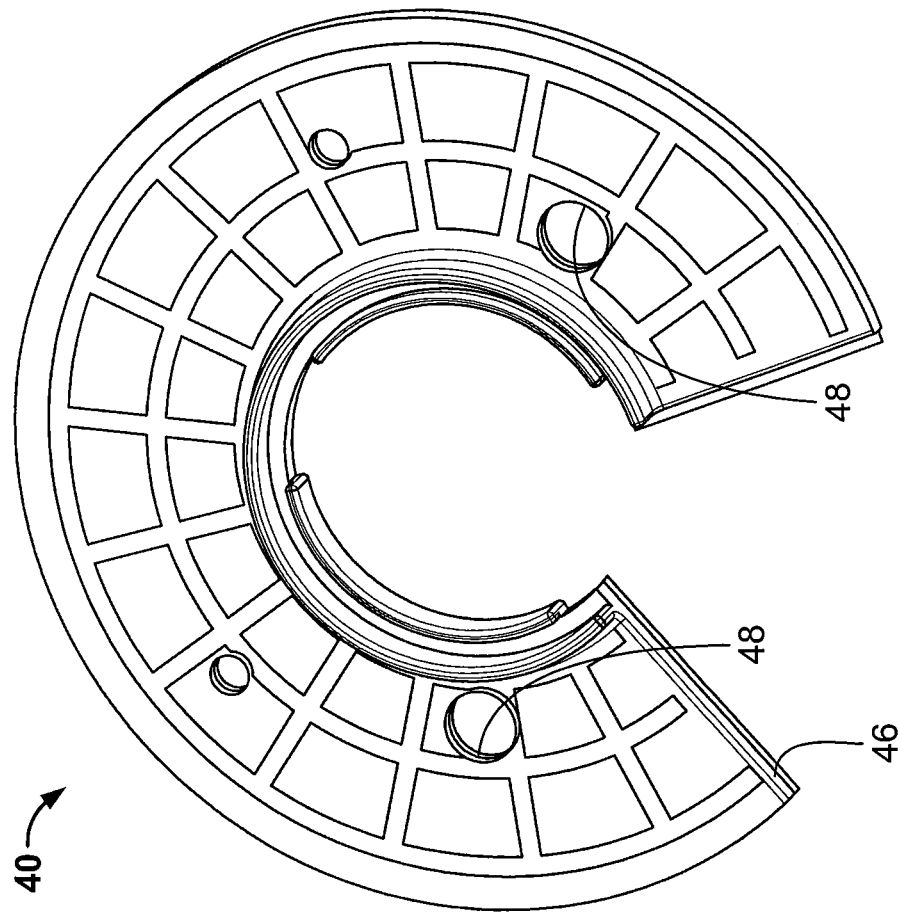
FIG. 6C is a front perspective view of the flange of FIG. 6A.

As illustrated in FIGS. 3-4A, each annular member 30 includes an outer surface 32, an inner surface 34, and a plurality of circumferentially-spaced apart members 36, such as spikes, extending radially outwardly from the outer surface 32. Each annular member 30 also includes adjacent spaced apart edges 33a, 33b that form a longitudinally extending opening or slot 39. The slot 39 of each annular member 30 is configured to align with the longitudinally extending opening 24 of the tube 20 to facilitate installation of the elongate tube 20 and the plurality of annular members 30 as an assembly onto a conductor.

Each annular member 30 may include at least one retaining member 37 having an aperture 37a therethrough that is configured to receive a retaining rod 50 extending therethrough to help maintain the slots 39 of the annular members 30 and the opening 24 of the tube aligned prior to and during installation of the apparatus 10 onto a power line. However, in other embodiments, retaining members 37 may not be utilized as the retaining rod 50 extending between adjacent members 36 may be sufficient to prevent rotation of the annular members 30 and maintain the slots 39 of the annular members 30 and the opening 24 of the tube aligned. In the illustrated embodiment, each annular member 30 includes two retaining members 37, one on each side of the slot 39. Each retaining member 37 extends from the outer surface 32 of the annular member 30 between adjacent members 36. However, other configurations may be utilized.

The illustrated apparatus 10 is configured to prevent squirrels and other animals from climbing on equipment or entering substations via overhead power lines. A squirrel, or other animal, attempting to traverse the apparatus 10 will place its paws on the outer surface 32 of one or more of the annular members 30 to avoid the members 36. However, the force from the squirrel's paws will cause each annular member 30 to rotate which will cause the squirrel to fall off. Because each annular member 30 is configured to rotate independently of the other annular members 30, a squirrel cannot outrun the rotating annular members, which may be rotating at different speeds and in different directions.

As illustrated in FIGS. 3-4, the illustrated annular member 30 includes opposing flange portions 38a, 38b that form the slot 39. These flange portions 38a, 38b act as counterweights that provide the annular member 30 with a center of gravity located at the center of the annular member 30, which also coincides with the longitudinal axis L of the apparatus 10 when the annular member 30 is positioned on the tube 20. These flange portions 38a, 38b are utilized because the void created by slot 39 in each annular member 30 shifts the center of gravity of the annular member such that the annular member 30 would orient itself with the slot 39 upwardly, which is undesirable. Because the center of gravity of each annular ember 30 is shifted back to its center via the flange portions 38a, 38b, each annular member 30 will rotate freely and end up at random orientations after rotation has stopped.

The illustrated flange portions 38a, 38b are angled away from each other as illustrated in FIG. 4. This configuration may also facilitate placement of the annular member 30 onto a conductor C.

Embodiments of the present invention are not limited to the use of flanges 38a, 38b as counterweights. Various other types of counterweights may be utilized without limitation. For example, one or more counterweights may be attached to a respective member 36 on each side of the slot 39. In addition, any number of counterweights may be utilized including a single counterweight.

In some embodiments, the tube 20 has a diameter D1 of between about two inches and three inches (2"-3"), although other diameters may be utilized. For example, in a particular embodiment, the tube 20 has a diameter D1 of about 2.3".

In some embodiments, the tube 20 has a length L1 of between about two feet and three feet (2'-3'), although other lengths may be utilized. For example, in a particular embodiment, the tube 20 has a diameter D1 of about two and a half inches (2.5"). In the embodiment illustrated in FIG. 8, the illustrated assembly includes two tubes 20 joined together for a total length of about five feet (5').

In some embodiments, each annular member 30 has a length 30L (FIG. 4A) of about one to two inches (1"-2") and each member 36 may have a length L2 of about three inches (3") in length, although other dimensions may be utilized. According to some embodiments, the tube 20 has a thickness T1 in the range of from about 0.05 inch to 0.2 inch. In some embodiments, the thickness T1 of the tube 20 is substantially uniform and varies by no more than about 10%. According to some embodiments, each annular member 30 has a thickness T2 in the range of from about 0.05 inch to 0.2 inch. In some embodiments, the thickness T2 of each annular member 30 is substantially uniform and varies by no more than about 10%. Embodiments of the present invention are not limited to the various dimensions set forth herein.

The illustrated members 36 extending from each annular member 30 are spikes having a generally cylindrical configuration with a tapered distal end portion 36a. However, the members 36 may have various shapes and configurations without limitation. For example, in some embodiments, each member 36 may have a tapered configuration along its entire length L2 or along a substantial portion of its length L2. In other embodiments, the members 36 may have different shapes, such as curved or arcuate configurations. Embodiments of the present invention are not limited to the illustrated members 36.

The illustrated apparatus 10 of FIG. 1A includes a respective flange 40 attached to each of the first and second ends 20a, 20b of the tube 20. Each flange 40 is configured to prevent the plurality of annular members 30 from slipping off the ends 20a, 20b of the tube 20. In the illustrated embodiment, each flange 40 has an annular lip portion 44 that is configured to be inserted within or around the respective end 20a, 20b of the tube 20. The annular lip portion 44 may be sized and configured to form a snug fit with the tube 20 so as to maintain attachment of the flange 40 to the tube 20. Various ways of attaching the flange 40 to the tube 20 may be utilized and embodiments of the present invention are not limited to the illustrated flange configuration. For example, the flange 40 may be attached to the tube 20 via adhesive, via one or more fasteners, etc. In other embodiments, the annular lip portion 44 may be sized such that a respective end 20a, 20b of the tube 20 is inserted within the annular lip portion 44.

In addition, each flange 40 includes a slot 46 that aligns with the opening 24 in the tube 20 to facilitate installation of the apparatus 10 on a conductor.

Also, in the illustrated embodiment, each flange 40 includes at least one aperture 48 for receiving the retaining rod 50 therethrough. During installation of the apparatus 10 on a power line, the retaining rod 50 extends between and is removably attached to the flanges 40 on opposite ends 20a, 20b of the tube 20 via respective apertures 48. As described above, the retaining rod 50 also extends through each retaining member 47 in each annular member 30. As such, the slots 48 of the respective annular members 30 are aligned with the longitudinal opening 24 in the tube 20 and the slots 46 in the flanges 40. Furthermore, the retaining rod 50 inhibits rotation of the plurality of annular members 30 during the installation of the apparatus 10 on a conductor so that the annular member slots 39, the flange slots 46, and the opening 24 in the tube 20 remain aligned. Once the apparatus 10 is installed on a conductor, the retaining rod 50 is removed and can be discarded. The annular members 30 are then free to rotate on the tube 20.

FIGS. 5A-5C illustrate different embodiments of a retaining rod 50. In FIG. 5A, end portion 50a has a bent configuration that serves as a stop for the rod 50 when it is inserted within the apertures 48 of the flanges 40. In FIG. 5B, end portion 50a has an enlarged configuration that serves as a stop for the rod 50 when it is inserted within the apertures 48 of the flanges 40. In FIG. 5C, end portion 50a has a loop configuration that serves as a stop for the rod 50 when it is inserted within the apertures 48 of the flanges 40. However, retaining rods of various shapes and configurations may be utilized in accordance with embodiments of the present invention.

In the illustrated embodiment, one of the flanges 40 includes an attachment feature 43 that is configured to be gripped by a hotstick or other tool utilized by a technician to install, remove or otherwise manipulate the apparatus 10. Hot sticks are available from Hastings Fiber Glass Products, Inc., Hastings Mich. and A. B. Chance, Co., Centralia, Mo., for example. The attachment feature 43 may have various configurations without limitation. Alternatively, the apparatus 10 can be installed on a "hot" or powered line using gloves or the like.

Figure 7:
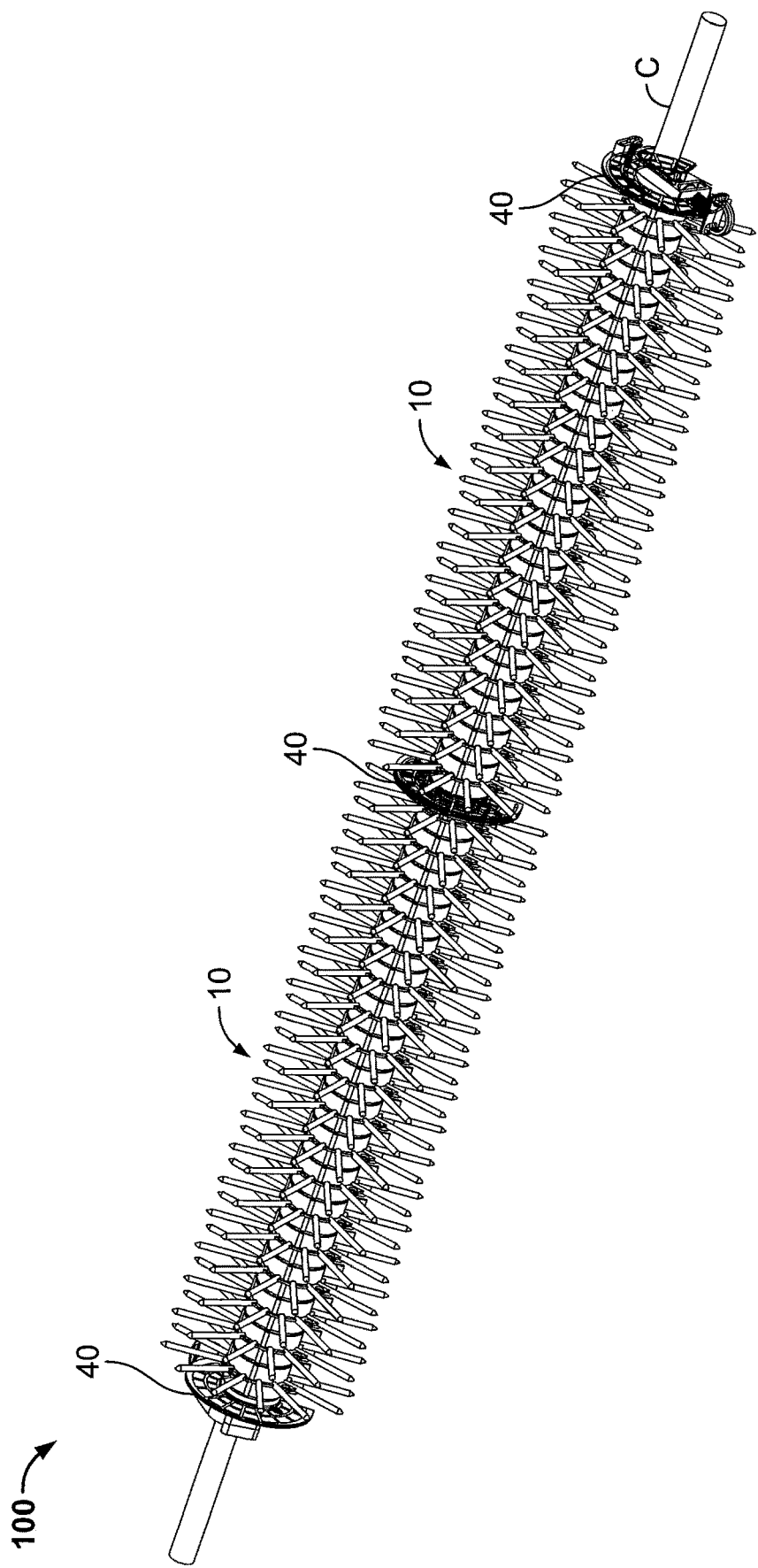
FIG. 7 is a perspective view of a protective apparatus for a distribution line conductor, according to some embodiments of the present invention.

FIG. 7 illustrates a protective apparatus 100 with two tube/annular member assemblies 10 connected together. The illustrated apparatus 100 of FIG. 7 includes two tubes 20 connected together via flanges 40, each tube 20 having a plurality of annular members 30, as described above.

The tube 20, annular members 30, and flanges 40 of the present invention may be formed of any suitable electrically insulating material. According to some embodiments, the tube 20 and annular members 30 may be formed out of a polypropylene co-polymer with UV additive and grey colorant. In some embodiments, the flanges 40 may be formed out of nylon. However, various other materials may be utilized for the tube 20, annular members 30 and flanges 40.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A protective apparatus for a distribution line conductor, the apparatus comprising:
   an elongate tube comprising opposite first and second ends, wherein the tube has a longitudinal axis and defines a longitudinally extending chamber configured to receive the conductor, wherein the tube comprises a longitudinally extending opening from the first end to the second end that facilitates installation of the elongate tube on the conductor; and
   a plurality of annular members concentrically positioned on the tube and configured to independently rotate about the longitudinal axis, wherein each annular member comprises an outer surface and a plurality of circumferentially-spaced apart members extending outwardly from the outer surface.

2. The apparatus of claim 1, wherein the members extending outwardly from each annular member outer surface comprise spikes.

3. The apparatus of claim 1, wherein the members extending outwardly from each annular member outer surface have an elongated configuration.

4. The apparatus of claim 1, wherein each annular member comprises a longitudinally extending slot configured to align with the longitudinally extending opening of the tube to facilitate installation of the elongate tube and the plurality of annular members as an assembly on the conductor.

5. The apparatus of claim 1, wherein each annular member comprises a counterweight configured to provide the annular member with a center of gravity at the longitudinal axis.

6. The apparatus of claim 4, wherein each annular member comprises a pair of counterweights configured to provide the annular member with a center of gravity at the longitudinal axis, wherein each counter weight is positioned on a respective side of the longitudinally extending slot.

7. The apparatus of claim 1, further comprising first and second flanges at the first and second ends of the tube respectively, wherein the flanges are configured to prevent the plurality of annular members from dislodging from the tube.

8. The apparatus of claim 7, further comprising a retaining rod removably secured to and extending between the first and second flanges, wherein the retaining rod is configured to inhibit rotation of the plurality of annular members during the installation of the apparatus on the conductor.

9. The apparatus of claim 8, wherein each annular member comprises a retaining member having an aperture, and wherein the retaining rod extends through each respective retaining member aperture of the annular members.

10. The apparatus of claim 7, wherein at least one of the first and second flanges is configured to be gripped by a hotstick or other tool to install, remove or otherwise manipulate the apparatus.

11. The apparatus of claim 7, wherein the first and second flanges each comprise a slot configured to align with the longitudinally extending opening of the tube to facilitate installation of the elongate tube, the plurality of annular members, and the first and second flanges as an assembly on the conductor.

12. A protective apparatus for a distribution line conductor, the apparatus comprising:
- an elongate tube comprising opposite first and second ends, wherein the tube has a longitudinal axis and defines a longitudinally extending chamber configured to receive the conductor, wherein the tube comprises a longitudinally extending opening from the first end to the second end;
- a plurality of annular members concentrically positioned on the tube and configured to independently rotate about the longitudinal axis, wherein each annular member comprises an outer surface and a plurality of circumferentially-spaced apart members extending outwardly from the outer surface, and wherein each annular member comprises a longitudinally extending slot; and
- first and second flanges at the first and second ends of the tube respectively, wherein the flanges are configured to prevent the plurality of annular members from dislodging from the tube, wherein the first and second flanges each comprise a slot, wherein the slots of the first and second flanges and the slots of the respective annular members are configured to align with the longitudinally extending opening of the tube to facilitate installation of the elongate tube, the plurality of annular members, and the first and second flanges as an assembly on the conductor.

13. The apparatus of claim 12, wherein the members extending outwardly from each annular member outer surface comprise spikes.

14. The apparatus of claim 12, wherein the members extending outwardly from each annular member outer surface have an elongated configuration.

15. The apparatus of claim 12, wherein each annular member comprises a counterweight configured to provide the annular member with a center of gravity at the longitudinal axis.

16. The apparatus of claim 12, wherein each annular member comprises a pair of counterweights configured to provide the annular member with a center of gravity at the longitudinal axis, wherein each counter weight is positioned on a respective side of the longitudinally extending slot.

17. The apparatus of claim 12, further comprising a retaining rod removably secured to and extending between the first and second flanges, wherein the retaining rod is configured to inhibit rotation of the plurality of annular members during the installation of the apparatus on the conductor.

18. The apparatus of claim 17, wherein each annular member comprises a retaining member having an aperture, and wherein the retaining rod extends through each respective retaining member aperture of the annular members.

19. The apparatus of claim 12, wherein at least one of the first and second flanges is configured to be gripped by a hotstick or other tool to install, remove or otherwise manipulate the apparatus.

\* \* \* \* \*